United States Patent [19]
Barton

[11] 4,034,376
[45] July 5, 1977

[54] RADIO DIRECTION FINDER WITH ARRAY ELEMENT SIGNAL PROCESSING

[75] Inventor: Paul Barton, Bishops Stortford, England

[73] Assignee: International Standard Electric Corporation, New York, N.Y.

[22] Filed: July 22, 1976

[21] Appl. No.: 707,844

[30] Foreign Application Priority Data

July 24, 1975 United Kingdom ............. 30975/75

[52] U.S. Cl. .......................... 343/112 R; 343/16 R; 343/112 C; 343/113 R
[51] Int. Cl.$^2$ ........................................... G01S 3/02
[58] Field of Search ......... 343/16 R, 112 R, 112 C, 343/113 R

[56] References Cited
UNITED STATES PATENTS 3,696,427 10/1972 Nard ............................. 343/112 R
3,924,236 12/1975 Earp et al. ........................ 343/16 R

*Primary Examiner*—Maynard R. Wilbur
*Assistant Examiner*—T. M. Blum
*Attorney, Agent, or Firm*—William T. O'Neil

[57] ABSTRACT

A radio navigational device for determining the angle of a mobile craft by analyzing the signals arriving at each element of a linear array of n equally spaced elements. A series of received R.F. pulses emanating from the mobile craft by transmission or reflection provide contemporaneous signals at the antenna elements with a phase difference $\psi$ between successive elements in accordance with the angle of arrival of the R.F. pulses. Using "zero" IF techniques, each signal of the series is processed to provide signal outputs in I and Q form. Sequential or parallel sampling of these I and Q signals provides a synthesized scanning beam signal from which $\psi$ is determined.

10 Claims, 8 Drawing Figures

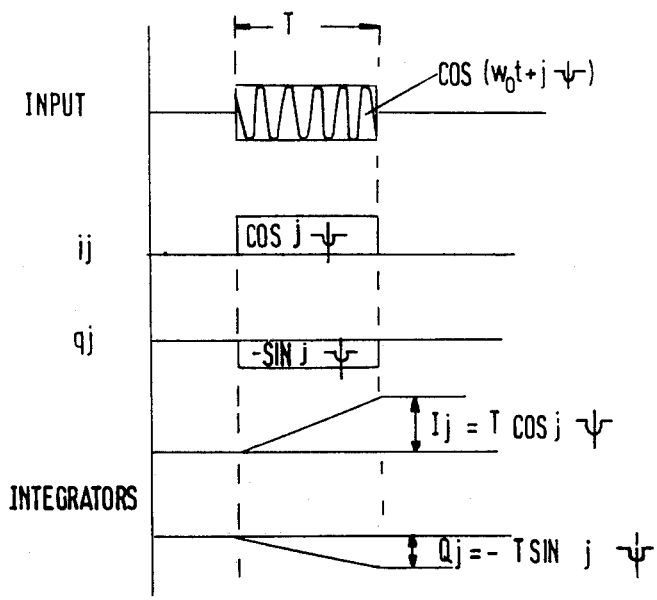
FIG.2
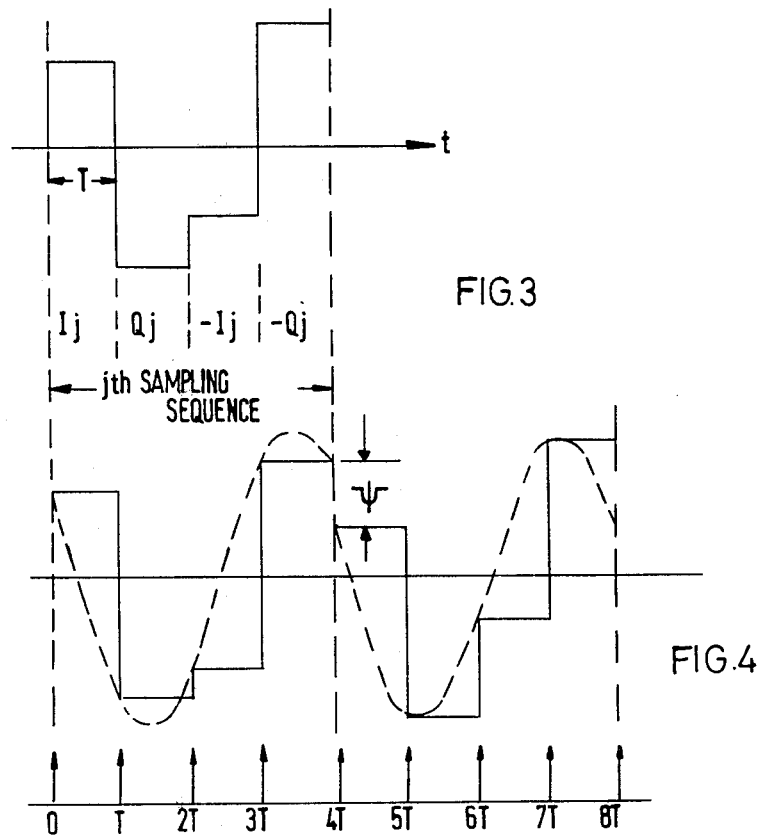
FIG.3
FIG.4

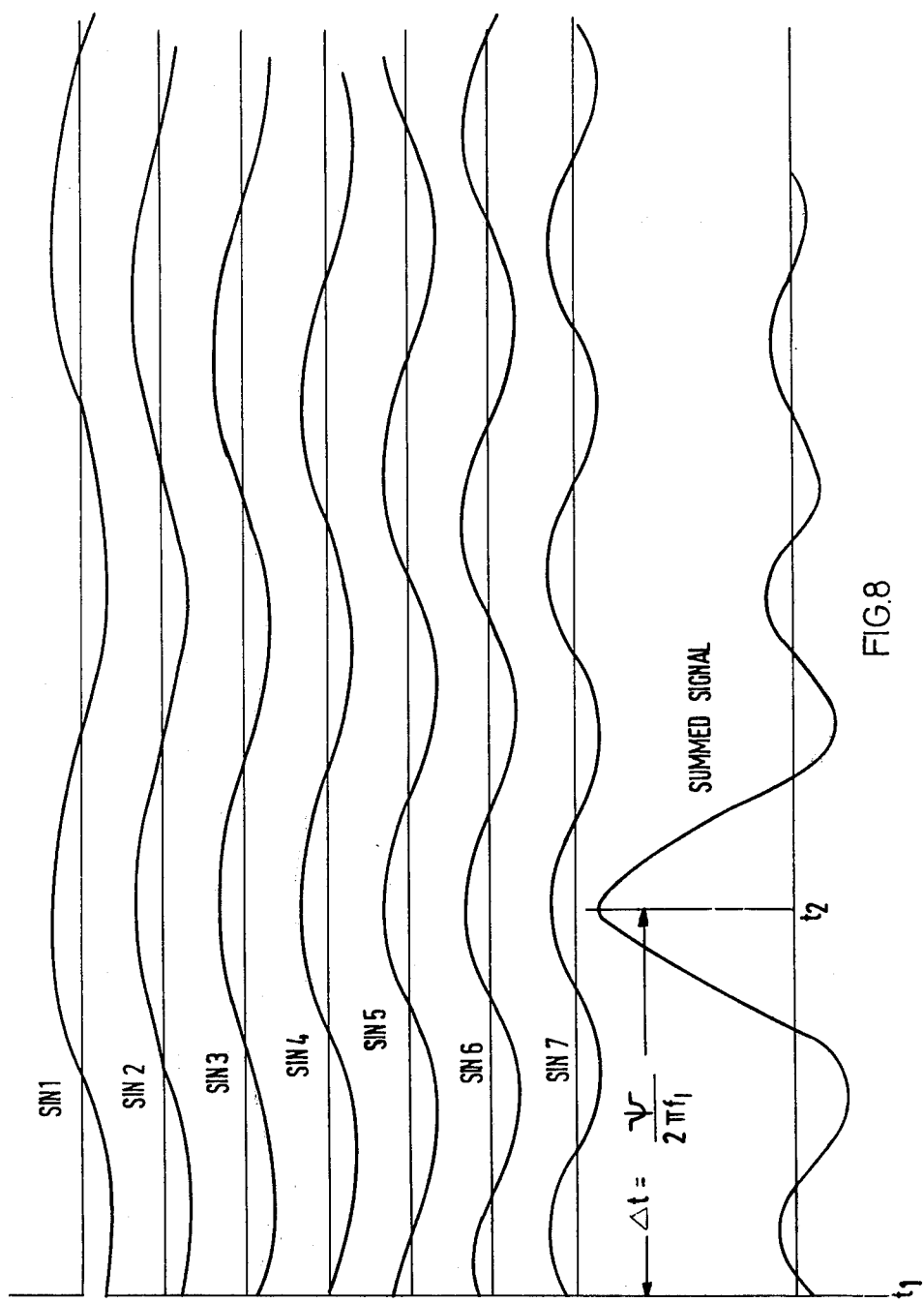

4,034,376

RADIO DIRECTION FINDER WITH ARRAY ELEMENT SIGNAL PROCESSING

BACKGROUND OF THE INVENTION

1. Field of the Invention

This invention relates to radio direction finding equipment.

2. Description of the Prior Art

Radio direction finder systems exist in the prior art in a number of forms. The type of direction finder to which the present invention relates is the type which determines the angle of arrival of the phase front of a signal transmitted by, or reflected from, an object to be located in angle.

A system of the particular type to which the present invention applies is described in U.S. Pat. No. 3,924,236. That prior art, sometimes referred to as a synthetic aperture system, requires a delay line constructed to exacting requirements and, therefore, relatively expensive.

The manner in which the present invention improves upon the prior art, in view of the aforementioned prior art disadvantage, and also in other ways will be evident as this description proceeds.

SUMMARY OF THE INVENTION

According to the invention there is provided radio direction finding equipment for deriving angular information in respect of a mobile craft from radio frequency pulses emanating from (received from or reflected from) the craft, including means responsive to each of the pulses to produce a series of $n$ simultaneous pulse signals of equal frequency with a phase difference $\psi$ between successive signals of the series as determined by the angle of arrival of the pulses from the craft. For each of the $n$ signals, a first mixing network is provided for mixing the signal with a first phase of a common local oscillator at the same frequency as that of the received signal. In parallel with this first network, a second mixing network is provided for mixing the signal with a second phase of the local oscillator in quadrature with the aforementioned first local oscillator phase for each of said first and second mixing networks. Means responsive to the respective zero frequency outputs of the two mixing networks provide outputs given respectively by $I_j$ and $Q_j$ where $I_j$ is proportional to $\cos j\psi$ and $Q_j$ is proportional to $\sin J\psi$, $j$ representing the position of the zero frequency responsive means. Means are also included for sampling said $n$ pairs of zero frequency responsive means to derive from each pair outputs in the form $I_j Q_j - I_j - Q_j$, and for processing the $n$ derived outputs to determine therefrom the phase difference $\psi$ and hence the angle of arrival of the pulses from the craft.

BRIEF DESCRIPTION OF THE DRAWINGS

FIGS. 2, 3, and 4 show waveforms relevant to the operation of portions of the embodiment of FIG. 1.

FIG. 8 shows waveforms relevant to the operation of the second embodiment.

DESCRIPTION OF THE PREFERRED EMBODIMENT

Figure 1:
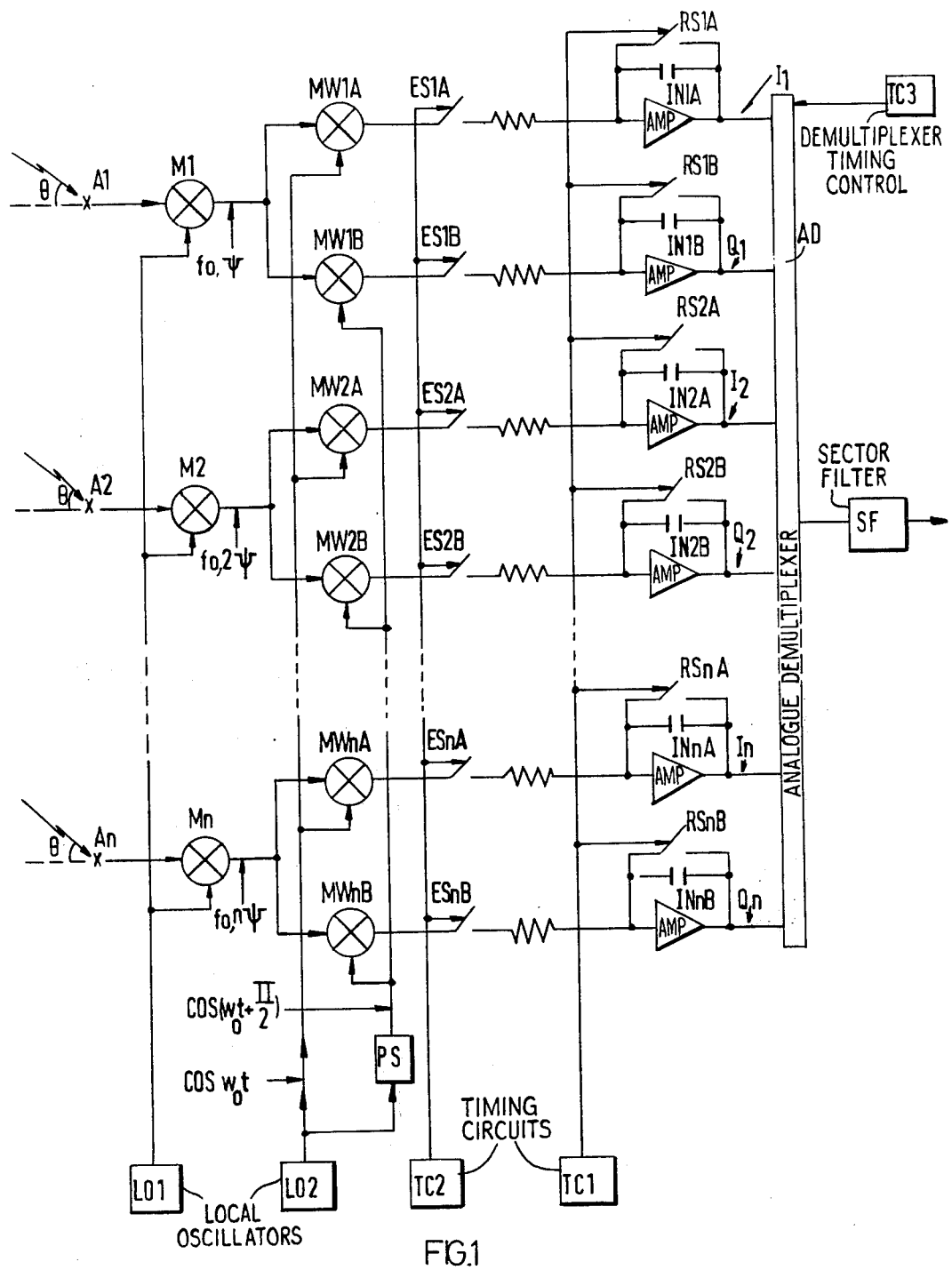
FIG. 1 shows a first embodiment of a radio direction finding equipment in accordance with the invention.

Referring to FIG. 1 successive radio frequency pulses of frequency $fc$, typically at 1GHz, each of duration T, typically 1usec, and spaced at typically 1m/sec., are received from an aircraft, either by reflection therefrom in a radar application or by generation thereat, on array of $n$ equally spaced antennas, A1 to A$n$ (typically numbering 25) with 2λ or 4λ spacing between centers so that each antenna may have directional receiving properties. FIG. 1 indicates simply the effective centers of each antenna.

Assuming the equipment is required to give elevation angle information, a vertical array with boresight normal to the array axis is employed. Each successive r.f. pulse arrives at angle $\theta$, and each such received pulse induces a series of simultaneous pulse signals of frequency $fc$ and duration T, which signals are fed to individual mixer M1 - M$n$ and down-converted to a frequency $fo$. This frequency $fo$ is typically 5MHz, and the conversion is effected by a common local oscillator L01 operation at the appropriate off-set frequency of $fc-fo$. Between the signals of the array elements there is a phase difference $\psi$ given by $2\pi d \sin \theta$, where $d$ is the spacing between adjacent elements of the array in units of wavelength.

Two stages of frequency conversion (and amplification) are preferably employed so that the normal advantages of a double IF system can be achieved. This does not however affect the subsequent signal processing which is described with reference to the $n$ simultaneous signals of frequency $fo$, duration T and with mutual phase differences $\psi$ determined by the angle of arrival of the pulses.

Each of the $fo$ signals is applied to two mixing networks, MW1A and MW1B providing one paralleled I and Q pair thereof. The first of each of the $n$ pairs of mixing networks is connected to a common local oscillator LO2 having a frequency of $fo$ (i.e. equal to that of the signal). The mixers of the network, i.e. one mixer in each pair is connected to oscillator L02 via a 90° phase shifter PS.

FIG. 2 shows how the outputs from each of the pair of mixers associated with an antenna element (I and Q outputs) contain a packet of "zero frequency" with amplitude proportional to the amplitude at the zero IF and the cosine and sine respectively of the phase difference between the signal and the local oscillator L02.

With an input from the $j^{th}$ antenna element equal to $\cos(\omega o t + j\psi)$, where $\psi = 2\pi d \sin \theta$ radians, the outputs of the $j^{th}$ I and Q channels are of the form $\cos j\psi$ and $\sin j\psi$.

Each of the pairs of mixers (for example MW1A and MW1B) have their outputs coupled via suitable enabling switches, such as ES1A and ES1B, to a pair of integrating networks such as IN1A and IN1B, each containing a reset switch typically RS1A.

The function of the integrators, which each include an amplifier and feedback capacitor, is to provide optimum performance in conditions of low signal to noise. They are reset prior to receiving the pulsed signal through these reset switches activated by a suitable common first timing circuit TC1. These integrators are only enabled for the pulse signal duration by the switches ES (ES1A and ES1B being one typical pair of ES switches) by a suitable common second timing circuit TC2, to provide a "range-gate" function. The integrators provide filtering properties equivalent to a filter matched to the signal pulse.

The outputs of the $j^{th}$ pair of integrators $$I_j = \int_0^T i_j \, dt \quad \text{and} \quad Q_j = \int_0^T q_j \, dt$$

are given by: $I_j = T \cos j \psi \quad Q_j = T \sin j \psi$

The remaining portion of FIG. 1, comprising an analog demultiplexer AD with its timing control TC3, and a sector filter SF, are only intended to outline the subsequent signal processing. FIG. 4 shows this in more detail and will be described later, however it is convenient now to outline the basis of this subsequent processing, which involves sampling the outputs from each of the integrator pairs in a 1 to $n$ sequence at the same sampling rate. The outputs from each pair of integrators are formed into the sequence (for the $j^{th}$ pair) $I_j$ $Q_j$ $-I_j$ $31$ $Q_j$.

As shown in FIGS. 3 and 4, if the duration of each sample in the sequence is $\tau$ (typically 1 $\mu$sec) then the waveform obtained is identical to sampling and holding a sine wave of frequency $\pi/4$ and phase $j\psi$.

Thus the complete sequence $I_1Q_1 - I_1 - Q_1, I_2Q_2 - I_2 - Q_z \ldots I_nQ_n - I_n - Q_n$ is identical in form to samples of a Doppler beat envelope from $n$ antenna elements with one cycle of beat per antenna element period and a phase jump of $\psi$ radians between adjacent elements.

The peak spectral component is at $$\frac{1}{4\tau} + \frac{\psi}{2\pi\tau} = \frac{1}{4\tau} + \frac{d \sin \theta}{4\tau} \, Hz$$

The use of a sector filter SF with a bandpass of $$\left[ \frac{1 - d \sin \theta \max}{4\tau} \right] \text{ to } \left[ \frac{1 + d \sin \theta \max}{4\tau} \right]$$

for azimuth (with a horizontal array) and $$\left[ \frac{1 - d \sin \theta \max}{4\tau} \right] \text{ to } \left[ \frac{1}{4\tau} \right]$$

for elevation will result in a signal waveform indistinguishable from that of a conventional Doppler scan, and so may be further processed by suitable known techniques using for example a frequency tracking filter to derive the required angle $\theta$ in accordance with the Doppler signal frequency.

Figure 5:
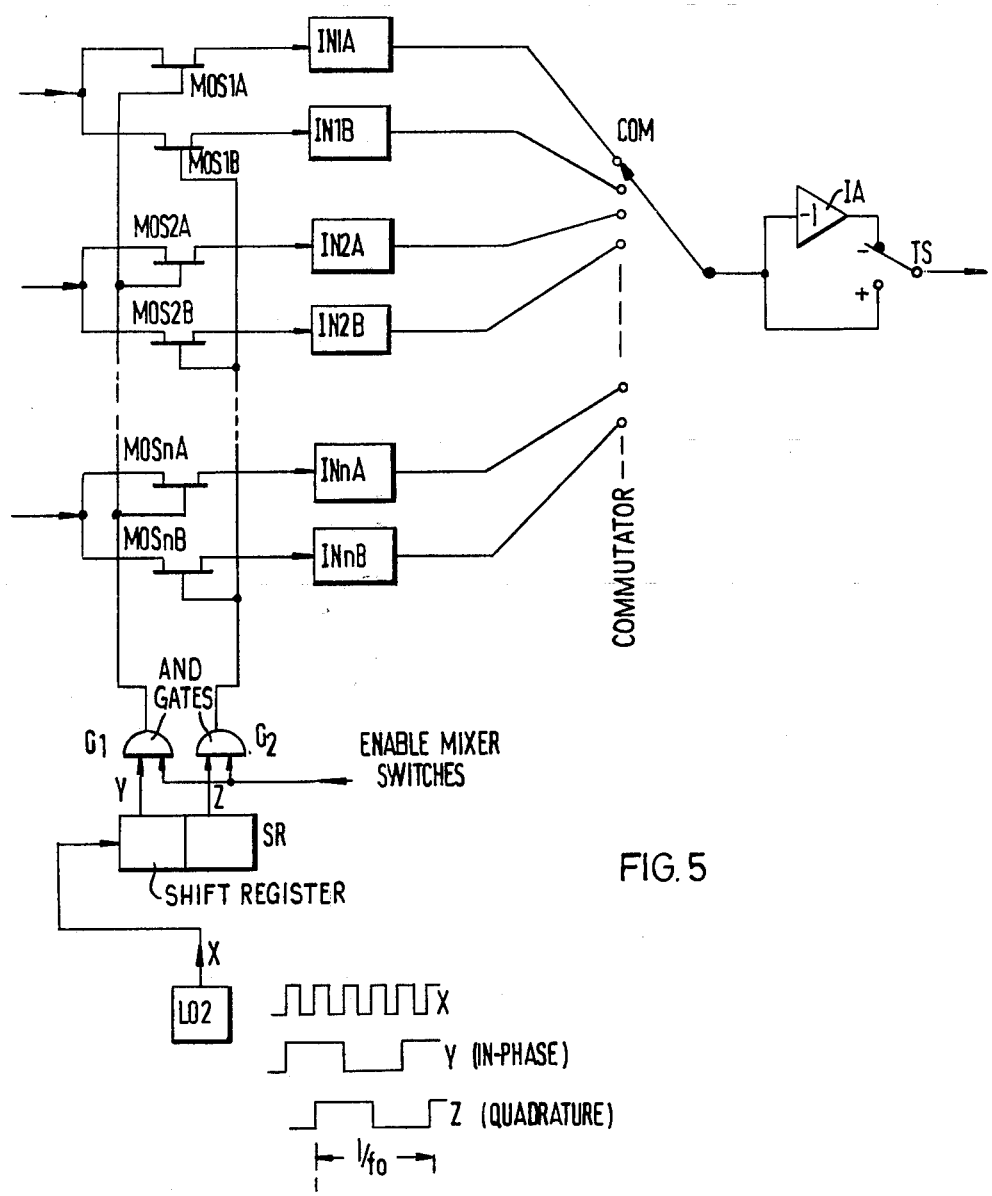
FIG. 5 shows the circuit diagram of a practical implementation of a portion of the system of the first embodiment.

As shown in FIG. 5, the balanced mixer function of the mixing networks is conveniently performed by analog switches such as MOS transistors MOS1A, MOS1B, etc., controlled by "inphase" and "quadrature" square waves of frequency $fo$ derived from the local oscillator LO2 (now of frequency $4fo$) via a shift register SR whose successive outputs form one input to a pair of AND gates G1, G2 having a common other input enabling the mixer switches.

Derivation of the $I_j$ $Q_j - I_j - Q_j$ sequence is effected by appropriate timing of the demultiplexer (AD of FIG. 1), shown in FIG. 5 as a commutator COM. The signal inversions required by the demultiplexing sequence are provided by a single inverting amplifier IA at the output of the multiplexer and a "toggling" switch TS.

Figure 6:
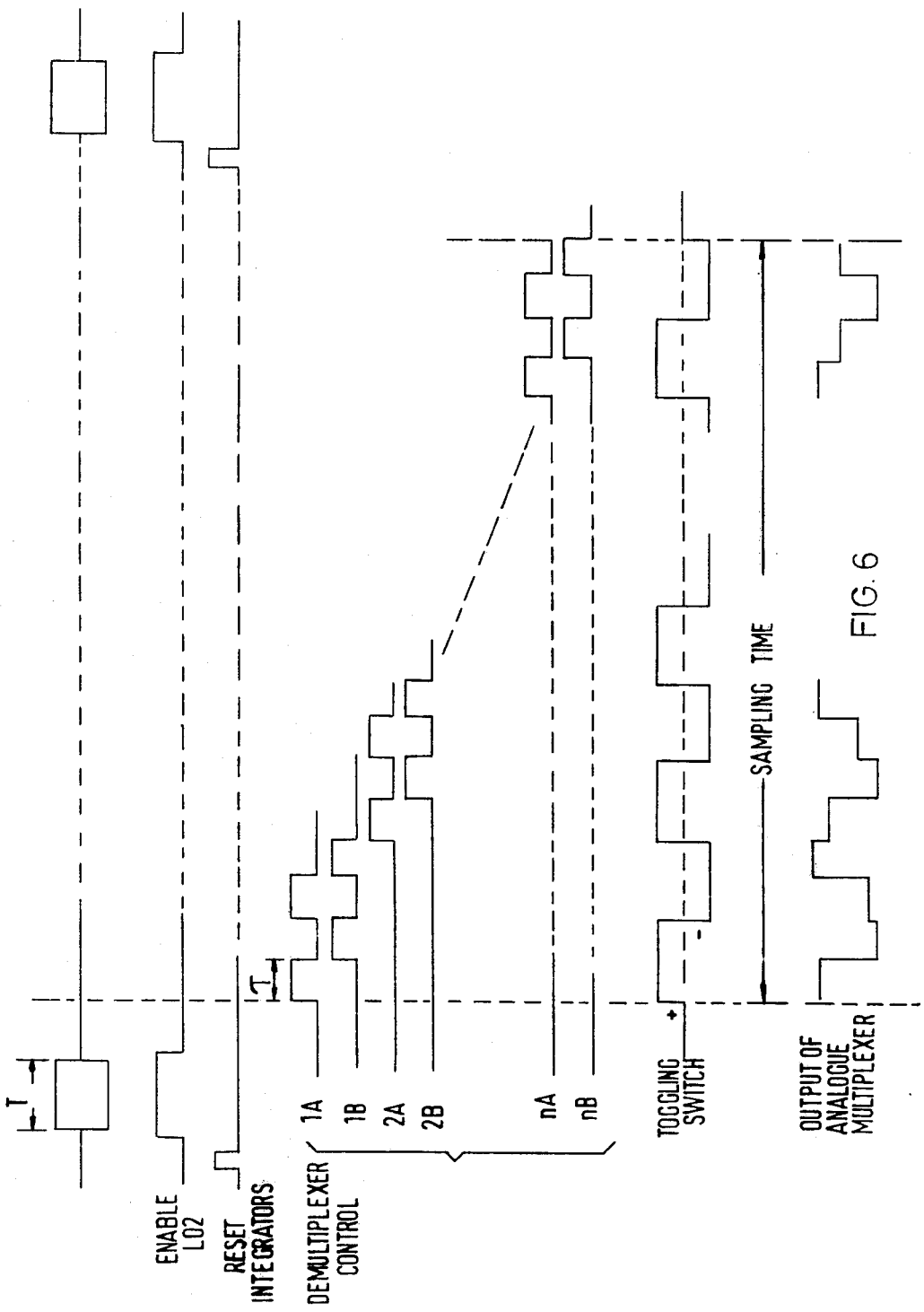
FIG. 6 shows the overall relationships between the various waveforms occurring throughout the first embodiment.

Control timing is shown in FIG. 6. The sampling sequence may be repeated in the inter-pulse period (of 1m sec) thereby producing multiple scan signals.

In the second embodiment illustrated, the basic difference in the processing of the series of $n$ simultaneous signals from that described so far, is in the sampling of the integrating networks. Accordingly, FIG. 7 only shows this portion of the circuit, the other aspects of the second embodiment remaining the same.

It will be recalled that the sequence $I_j Q_j - I_j - Q_j$ represents four samples of a single cycle of a sinusoid.

With each sample in the sequence of duration $\tau$ then the repeated cyclic commutation of these values represents a sine wave of frequency $1/4\tau$.

The rate of this cyclic commutation is a free choice and does not destroy the basic information. In principle, in the second embodiment, the sequences associated with the respective pairs of integrating networks are cyclically commutated in parallel at different rates:

Commutation rate of the first sequence $= F$
Commutation rate of the second sequence $= F-f$
Commutation rate of the third sequence $= F-2f$
Commutation rate of the $n$ th sequence $= F-(n-1)f$.

Figure 7:
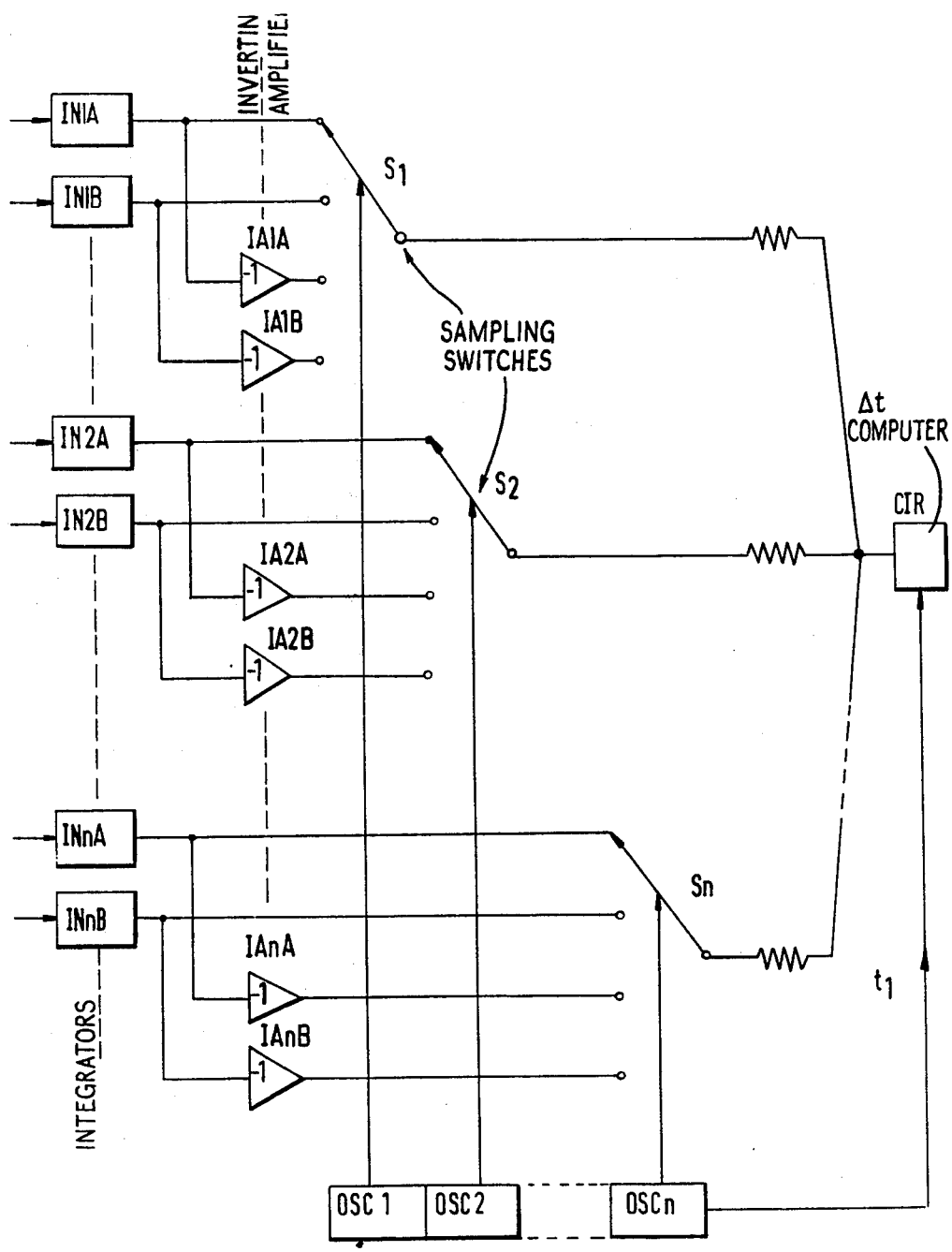
FIG. 7 shows portions of a second embodiment.

As shown in FIG. 7 this is implemented by individual sampling switches S1, S2, etc., each including the two necessary inverting amplifiers such as IA1A, IA1B, with successive switches in a 1 to $n$ sequence being driven at the respective frequencies of F, F-$f_1$, F-$2f_1$, etc. by suitably controlled commutation oscillators $OSC_1$, $OSC_2$ - - - $OSC_n$, those frequencies being readily derived by logic divider circuits.

With the aforementioned commutation oscillators mutually in phase at time $t_1$, the sequences correspond to sinusoids with different frequencies and phases are described by:

SIN 1 $= A \cos 2\pi Ft$
SIN 2 $= A \cos 2\pi (F-f)t + \psi$
SIN 3 $= A \cos 2\pi (F-2f)t + 2\psi$
SIN $n = A \cos 2\pi [F-(n-1)f]t + (n-1)\psi$ where $\psi = 2\pi d \sin \theta$.

As shown in FIG. 8 this parallel sampling sequence adds the signals together, the shape of the envelope in time of the resultant signal being the radiation pattern of the array which, implicit in this description, is of sin $x/x$ form. The timing $t_2$ of the peak of the pulse in relation to the time $t_1$ (i.e. $\Delta t$), when all the commutation oscillators are in phase (at the commencement of the sampling sequence) is a measure of the sine of the angle of arrival $\theta$ of the pulse with respect to the boresight of the array, and is effected by suitable circuitry CIR. This circuit CIR will be recognized as a $\Delta t$ computer, i.e. by solving the equation $\Delta t = \psi/(2\pi f)$, by known analog techniques. The multiple oscillators for the sampling sequence can be at conveniently low frequencies allowing implementation by digital methods.

The above described sampling technique can operate satisfactorily in multiple target situation.

It is to be understood that the foregoing description of specific examples of this invention is made by way of example only and is not to be considered as a limitation on its scope.

What is claimed is:

1. Radio direction finding equipment for deriving information respecting the angular position of a mobile craft with respect to said equipment from radio frequency pulses signals emanting from said craft, comprising:

antenna means having $n$ elements responsive to said emanating pulses to produce a series of $n$ contemporaneons pulse signals to equal frequency and with phase difference $\psi$ between successive signals of said series determined by the angle of arrival of said pulses from said mobile craft;

a first mixing network including $n$ first mixers each responsive to a corresponding one of said antenna elements and to a first phase of a local oscillaton providing a local oscillaton signal at substantially the same frequency as that of said emanating pulse signals;

a second mixing network including $n$ second mixers each responsive to a corresponding one of said antenna elements and to a second phase of said local oscillaton, said second phase being substantially at $\pi/2$ radians with respect to said first oscillaton phase;

zero response means providing $n$ pairs outputs and being responsive to the outputs of said first and second mixing networks to provide predetermined output corresponding to the occurrance of zero frequency output from each mixer of said first and second mixer networks, said predetermined output being characterized by $I_j$ and $Q_j$, where $I_j$ is proportional to $\cos j\psi$ and $Q_j$ is proportional to $\sin j\psi$, $j$ representing the position of said zero frequency output;

sampling means responsive to said $n$ pairs of outputs of said zero response means to derive from each of said pairs outputs in the form $I_j Q_j - I_j - Q_j$;

and signal processing means for processing the $n$ output pairs of said sampling means to determine therefrom the value of said $\psi$ which is the phase difference of said emanating signal between successive elements of said antenna means and characterizes said angle of arrival of said pulses from said mobile craft.

2. Apparatus according to claim 1 in which said antenna means comprises a linear array of said $n$ elements arranged in a line generally orthogonal to the centerline of the section of space within which said angular position of said craft is to be determined.

3. Apparatus according to claim 1 in which said sampling means comprises a commutation for successively sampling said $n$ pairs of outputs of said zero response means in a 1st to $n$th sequence at a sampling frequency such as to produce successive single cycles of a sinusoid with a phase jump of $\psi$ between adjacent cycles.

4. Apparatus according to claim 3 in which said sampling means are followed by signal processing means for determining the effective frequency of said sinusoid.

5. Apparatus according to claim 1 in which said sampling means comprises $n$ commutatons for simultaneously sampling said $n$ pairs of outputs of said zero response means at respective 1st to $n$th sampling frequencies having the same difference frequency such as to produce $n$ simultaneous but different frequency sinusoids with successive phase displacements of value $\psi$.

6. Apparatus according to claim 5 in which said processing means includes means for determining the time at which the initial in-phase condition of said $n$ commutatons occus, and means for determining the subsequent time at which the in-place condition of said $n$ sinusoids occurs, the difference of said time of said initial in-place condition of said $n$ commutatons occurs and said subsequent time providing a factor which is a function of said angular position.

7. Apparatus according to claim 1 including means for enabling said mixing networks substantially only for the duration of each of said series of $n$ contemporaneous signals.

8. Apparatus according to claim 1 including means for re-setting said zero response means subsequent to the sampling thereof in respect to a received pulse and prior to reception of the next pulse emanating from said craft.

9. Apparatus according to claim 1 in which each of said zero response means comprises an integrating network.

10. Apparatus according to claim 1 in which each of said pairs of mixing networks comprises a pair of analog switches controlled in phase quadrature and a square wave local oscillator is included for providing local oscillaton signals in said phase quadrature therefor.

* * * * *